(12) United States Patent
Polydoros et al.

(10) Patent No.: US 10,931,350 B2
(45) Date of Patent: Feb. 23, 2021

(54) DISTRIBUTED COLLABORATIVE BEAMFORMING IN WIRELESS NETWORKS

(71) Applicant: TrellisWare Technologies, Inc., San Diego, CA (US)

(72) Inventors: Andreas Polydoros, San Diego, CA (US); Cenk Köse, San Diego, CA (US)

(73) Assignee: TRELLISWARE TECHNOLOGIES, INC., San Diego, CA (US)

(*) Notice: Subject to any disclaimer, the term of this patent is extended or adjusted under 35 U.S.C. 154(b) by 0 days.

(21) Appl. No.: 16/513,642

(22) Filed: Jul. 16, 2019

(65) Prior Publication Data

US 2021/0021311 A1     Jan. 21, 2021

(51) Int. Cl.
| | |
|---|---|
| H04B 7/06 | (2006.01) |
| H04B 17/309 | (2015.01) |
| H04W 72/04 | (2009.01) |
| H04L 25/02 | (2006.01) |

(52) U.S. Cl.
CPC ......... *H04B 7/0617* (2013.01); *H04B 7/0639* (2013.01); *H04B 17/309* (2015.01); *H04L 25/0224* (2013.01); *H04W 72/0453* (2013.01)

(58) Field of Classification Search
CPC ........... H04W 72/0453; H04W 72/046; H04W 72/0466; H04W 72/0473; H04B 7/0617; H04B 7/0626; H04B 7/0632; H04B 7/0671; H04B 7/0639; H04B 17/309; H04L 25/0224–0264
See application file for complete search history.

(56) References Cited

U.S. PATENT DOCUMENTS

| | | | | |
|---|---|---|---|---|
| 5,432,821 | A * | 7/1995 | Polydoros | ......... H04L 25/03337 375/340 |
| 10,042,852 | B2 * | 8/2018 | Boudreau | ................ H04B 7/06 |
| 2004/0185887 | A1 | 9/2004 | Wolman et al. | |
| 2008/0075058 | A1 * | 3/2008 | Mundarath | ........... H04W 88/08 370/342 |
| 2008/0107044 | A1 | 5/2008 | Blair et al. | |

(Continued)

OTHER PUBLICATIONS

Alizadeh, Ardalan, et al., "Optimal Beamforming in Two-Way Relay Networks with Cognitive Radio Capabilities," IEICE Transactions on Communications, vol. E94-B, Issue 11, Nov. 2011, The Institute of Electronics, Information and Communication Engineers, pp. 3089-3097. (Year: 2011).*

(Continued)

*Primary Examiner* — Afsar M Qureshi
(74) *Attorney, Agent, or Firm* — Perkins Coie LLP

(57) ABSTRACT

Devices, systems and methods for collaborative wireless communication in a wireless network are described. One example method includes performing, by a first node of a plurality of nodes, a communication with at least a second node of the plurality of nodes, receiving, by the first node from a destination node of the plurality of nodes, a probe, computing, based on the probe, a phase of a strongest tap of a channel estimate between the first node and the destination node, computing a phase correction based on the phase of the strongest tap and a phase difference between a first phase of the first node and a second phase of a reference node, wherein the phase difference is based on the communication, and transmitting, to the destination node, a message with the phase correction.

21 Claims, 8 Drawing Sheets

(56) References Cited

U.S. PATENT DOCUMENTS

| | | | | |
|---|---|---|---|---|
| 2012/0088514 | A1* | 4/2012 | Lee | H04B 7/0478 |
| | | | | 455/450 |
| 2012/0269146 | A1* | 10/2012 | Pajukoski | H04B 7/024 |
| | | | | 370/329 |
| 2014/0056212 | A1 | 2/2014 | Blair et al. | |
| 2014/0161015 | A1 | 6/2014 | Brown, III et al. | |
| 2016/0043883 | A1 | 2/2016 | Zirwas | |
| 2017/0055281 | A1* | 2/2017 | Islam | H04W 72/121 |
| 2017/0331644 | A1* | 11/2017 | Urie | H04B 10/112 |
| 2018/0359011 | A1* | 12/2018 | Doostnejad | H04W 16/28 |

OTHER PUBLICATIONS

Dong, Min, et al., "Optimal Multi-antenna Relay Beamforming with Per-Antenna Power Control," IEEE International Conference on Communications (ICC), Jun. 10-15, 2012, Ottawa, Canada, IEEE, pp. 2192-2196. (Year: 2012).*

Kha, Ha Hoang et al., "Optimization of Cooperative Beamforming for SC-FDMA Multi-User Multi-Relay Networks by Tractable D.C. Programmingm" IEEE Transactions on Signal Processing, vol. 61, Issue 2, Jan. 15, 2013, IEEE, pp. 467-479. (Year: 2013).*

Ramezani-Kebrya, Ali, et al., "Optimal Cooperative Relay Beamforming for Interference Minimization," Wireless Communications Symposium, Proceedings of IEEE International Conference on Communications (ICC), Jun. 11, 2015, London, United Kingdom, IEEE, pp. 2500-2505. (Year: 2015).*

Berger, S. , et al., "Carrier Phase Synchronization of Multiple Distributed Nodes in a Wireless Network", 8th IEEE Workshop on Signal Processing Advances for Wireless Communication (SPAWC), Helsinki, Finland, Jun. 2007, 5 pages.

Mudumbai, R. , et al., "Distributed Transmit Beamforming: Challenges and Recent Progress", IEEE Communications Magazine, vol. 47, No. 2, Feb. 2009, pp. 102-110.

International Search Report and Written Opinion dated Oct. 13, 2020 for International Application No. PCT/US2020/042277, 10 pages.

* cited by examiner

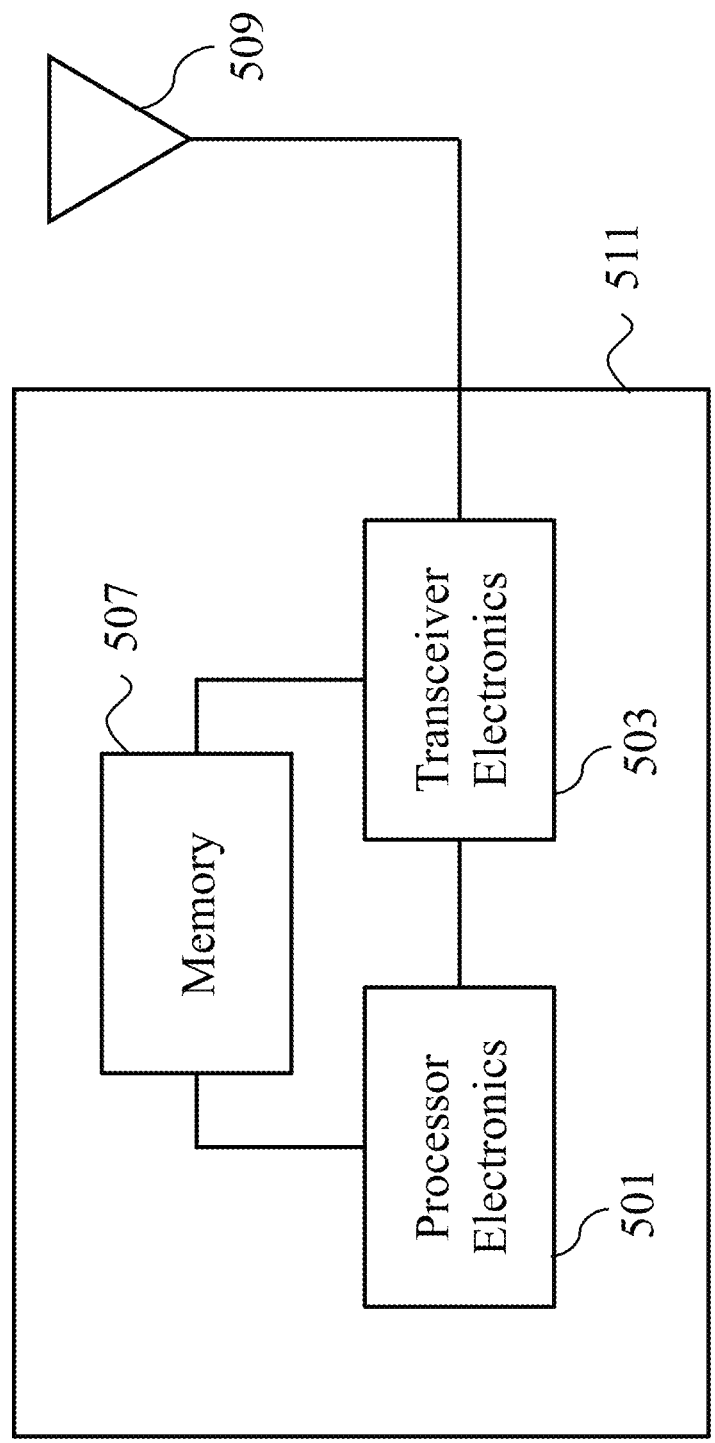

DISTRIBUTED COLLABORATIVE BEAMFORMING IN WIRELESS NETWORKS

TECHNICAL FIELD

This document is directed to collaborative wireless communications amongst nodes in a wireless network.

BACKGROUND

Ad-hoc networks may include spatially distributed, single-antenna, power-limited radio nodes, which may be dynamic, not fully connected, and operating in multipath fading propagation environments. These nodes can collaborate to relay messages to a remotely-located radio node, which is not reachable via straightforward communication protocols.

SUMMARY

This document relates to methods, systems, and devices for distributed collaborative beamforming in wireless networks. Embodiments of the disclosed technology can be configured to provide range extension, i.e., the ability to relay messages collaboratively to a remote node that is otherwise unreachable by a single local radio or even by multiple radios transmitting simultaneously in a phase-incoherent manner. The distributed collaborative beamforming technology disclosed in this patent document can be implemented in various devices including wireless communication receivers in wireless communication systems, including, e.g., radio communication devices, mobile devices and hot-spots in broadband wireless networks.

In one exemplary aspect, a method for collaborative wireless communication is disclosed. The method includes performing, by a first node of a plurality of nodes, a communication with at least a second node of the plurality of nodes, receiving, by the first node from a destination node of the plurality of nodes, a probe, computing, based on the probe, a phase of a strongest tap of a channel estimate between the first node and the destination node, computing a phase correction based on the phase of the strongest tap and a phase difference between a first phase of the first node and a second phase of a reference node, wherein the phase difference is based on the communication, and transmitting, to the destination node, a message with the phase correction.

In another exemplary aspect, a method for collaborative wireless communication is disclosed. The method includes performing, by a first node of a plurality of nodes, a communication with at least a second node of the plurality of nodes, computing, based on the communication, a plurality of phase differences between the first node and every node of the plurality of nodes, receiving, from a first destination node of the plurality of nodes, a first probe, computing, based on the first probe, a first channel estimate between the first node and the first destination node, selecting, based on the plurality of phase differences, a reference node from the plurality of nodes, computing, subsequent to selecting the reference node, a first phase correction based on (i) the first channel estimate and (ii) a phase difference between a first phase of the first node and a second phase of the reference node, and transmitting a message based on the first phase correction.

In yet another exemplary aspect, a system for collaborative wireless communication is disclosed. The system includes a plurality of nodes with each node being configured to receive a message from a source node, perform a bi-directional communication with at least one other node of the plurality of nodes, compute, based on the bi-directional communication, a plurality of phase differences between the each of the plurality of nodes and every other node of the plurality of nodes, receive a probe from a destination node that is different from the source node and each of the plurality of nodes, compute, based on the probe, a phase of a strongest tap of a channel estimate between each of the plurality of nodes and the destination node, select, based on the plurality of phase differences, a reference node from the plurality of nodes, compute, subsequent to selecting the reference node, a phase correction based on the phase of the strongest tap and a phase difference between a first phase of the each of the plurality of nodes and a second phase of the reference node, and transmit, to the destination node and concurrently with every other node of the plurality of nodes, the message with the phase correction.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 5 is a block diagram representation of a portion of a radio that may be used to implement embodiments of the disclosed technology.

DETAILED DESCRIPTION

A mobile ad hoc network (MANET) is a continuously self-configuring, infrastructure-less network of mobile devices connected wirelessly. A MANET typically includes spatially-distributed, single-antenna, power-limited radio nodes, which may be both terrestrial and non-terrestrial. In an example, the network may be dynamic (nodes are moving), and may not be fully connected (multiple hops may be needed for full network coverage). In another example, the radios may operate in multipath fading propagation environments, and may employ constant-envelope (CE) modulations for increased power efficiency.

Distributed collaborative beamforming was originally proposed to improve the data exfiltration capability of sensor networks consisting of static low-powered nodes with narrowband (low data rate) measurements. Its benefits included increased energy efficiency, and consequently, increased operational longevity.

Embodiments of the disclosed technology leverage another facet of distributed collaborative beamforming, namely range extension, i.e. the ability to relay messages collaboratively to a remote (or destination) node that is otherwise unreachable by a single local radio or even by multiple radios transmitting simultaneously in a phase-incoherent manner. The range extension benefit can also be translated to other desired attributes such as higher rates to a destination, lower required transmit power, and the like.

In order to realize the coherence gains provide by distributed collaborative beamforming, the radio frequency (RF) phases-of-arrival of individual transmissions need to align at the intended destination. In contrast to classical beamforming that relies on collocated emitters, the RF phase of transmission is different (and typically unknown or un-estimable) for each participating emitter in distributed collaborative beamforming. Therefore, a process of phase coordination (also referred to as self-coherence) is required across the radios. This process typically compensates for phase changes due to mobility, as well as RF impairments such as oscillator frequency offsets, drifts and phase noise.

Section headings are used in the present document to improve readability of the description and do not in any way limit the discussion or embodiments (and/or implementations) to the respective sections only.

Existing Approaches to Distributed Collaborative Beamforming

Implementations of distributed collaborative beamforming focus on phase calibration or phase adjustments, and there are several mechanisms by which distributed collaborative beamforming phase calibration can be achieved.

Figure 1A:
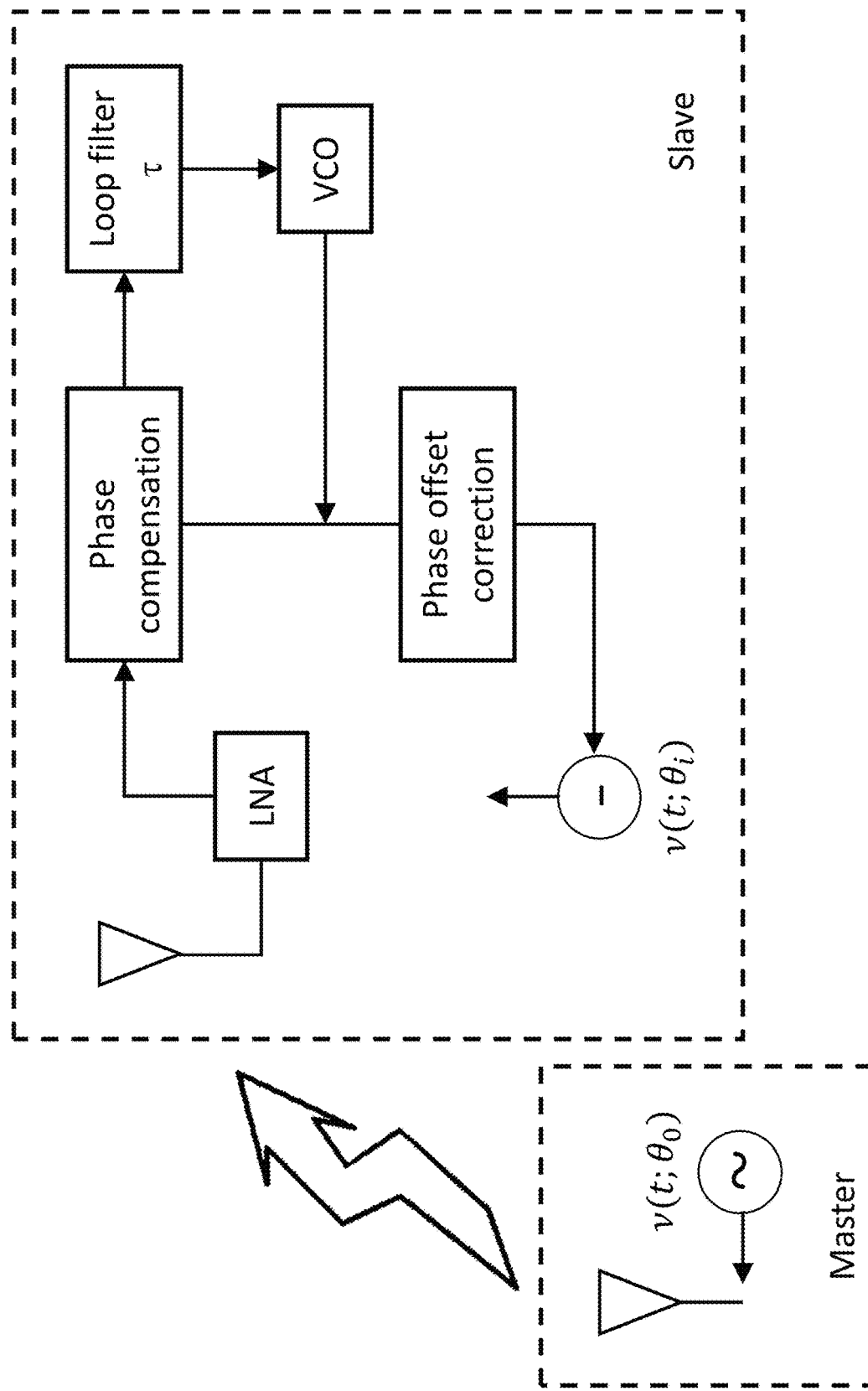
FIGS. 1A, 1B and 1C show existing approaches and implementations for distributed collaborative beamforming.

FIG. 1A shows an example of master-slave analog synchronization in which RF carrier phases are aligned using narrowband calibration beacons exchanged between radios to available phase locked loop (PLL) circuitry. This approach is not feasible for all radio front-ends, including modern tactical radios with integrated transceiver architectures that offer limited or no control of RF PLLs to enable such synchronization.

Figure 1C:
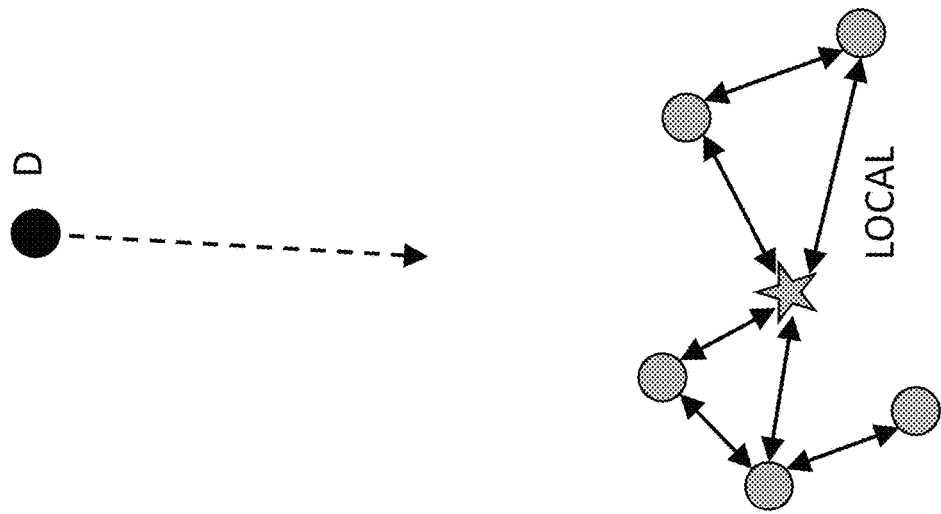
Figure 1B:
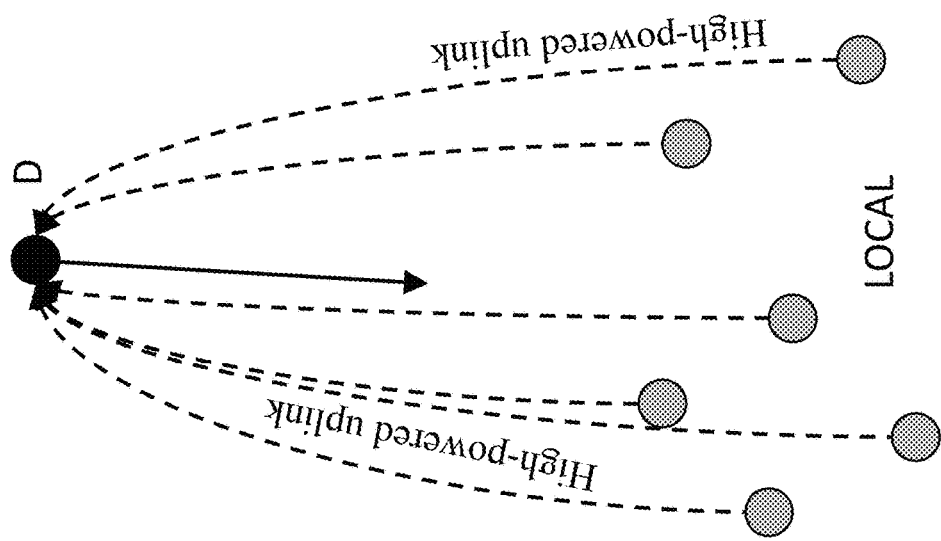

FIG. 1B shows an example of the closed-loop digital phase control approach in which the destination node (DST) manages the phase of each radio separately. This approach is ill-suited to MANET tactical operations because it requires a high-powered uplink from each radio, which is a direct consequence of per-radio management of the phases. This may result in an increase in the detectability of the radio, which may compromise the tactical operation. Another shortcoming of the closed-loop approach is the complexity burden imposed on the destination node, which may not have the processing capability, thereby limiting the applicable use cases.

FIG. 1C shows an example of an open-loop approach that requires the radios to first achieve phase calibration locally, i.e. with respect to a predetermined local reference radio (or node), and then leverage downlink (from the destination node to the other nodes) signals to beamform to the destination. The overall beamforming phase calibration is accomplished with reduced reliance on the destination node, improving overall system robustness, but requires the designation (or establishment) of a reference node prior to the starting beamforming.

For the existing approaches, and in the present document, it is noted that "open-loop" does not mean that the destination is not involved at all, i.e., "open-loop" does not mean "destination-blind". Rather, it means that phase-calibrating to the destination involves only one-way signaling from the destination to the local network ("downlink" only), as opposed to two-way signaling that also requires the local nodes to transmit to the destination, which is referred to as the closed-loop option.

Exemplary Embodiments of Distributed Collaborative Beamforming

Embodiments of the disclosed technology provide methods of phase adjustment for enabling distributed beamforming in relevant scenarios with real-world radio constraints, RF degradations and multipath propagation. Furthermore, local mechanisms for data sharing and collaborative transmission with coarse timing synchronization across the radios, which are typically available in different wireless networking technologies, are leveraged.

The present document describes distributed collaborative beamforming from a set of spatially-distributed radio network nodes $N_i$; i=1, 2, . . . , K, towards a remote collaborating radio destination node D. In some embodiments, a method for distributed collaborative beamforming in a network comprising multiple network nodes (or nodes, or radios) comprises four stages.

Stage 1. Each network node gets possession of a common message sent by a source S, which is the message to be beam-formed towards the destination D.

Stage 2. The network nodes self-cohere via a sequence of bidirectional signal exchanges (or a combination of signal and message exchanges), performed between chosen pairs of nodes. This results in all nodes in the network having been included in the self-coherence process and having derived and stored a phase correction value.

Stage 3. Each network node receives a broadcast probe signal from the destination node D. Based on this probe, each network node estimates a complex-valued, multipath-fading baseband channel model, identifies the strongest tap in the channel model, and computes the phase (argument) of the strongest complex-valued tap. In some embodiments, all the network nodes receive the probe from the destination at roughly the same time (e.g., within a timeslot, or within adjacent timeslots).

Stage 4. Each network node quasi-synchronously (e.g., within a pre-defined turn-around time upon destination-probe reception) transmits the common message with a total correction phase added to the phase (argument) of the complex baseband values representing the information stream (of the common message). The total correction phase is equal to the negative of the sum of the node's phase correction value (as derived in Stage 2) and the phase (argument) of the strongest complex-valued tap (as estimated in Stage 3).

In some embodiments, and for constant-envelope modulated signals, baseband phase correction can be implemented simply by an index shift into the look-up table that generates the information carrying digital phase sequence, thereby maintaining the constant envelope property for the transmitted signal.

In some embodiments, a network node may perform the four stages in an order different from that described above, as long as Stage 4 (which includes the actual beamforming operation) is performed last. For example, the network node may first receive a probe from the destination and compute the phase of the strongest tap of the channel estimation (Stage 3), then receive the common message (Stage 1), followed by participating in the self-coherence process with the other network nodes to derive its phase correction value (Stage 2), and finally perform the beamforming operation (Stage 4). For another example, the network node may first participate in the self-coherence process with the other network nodes to derive its phase correction value (Stage 2), then receive a probe from the destination and compute the phase of the strongest tap of the channel estimation (Stage 3), followed by receiving the common message (Stage 1), and finally perform the beamforming operation (Stage 4).

In some embodiments, the four-stage process described above produces a composite (co-transmitted, superimposed) signal at the destination node which has a larger signal-to-noise ratio (SNR) than what would have been received had the nodes co-transmitted in a phase-incoherent manner, thereby producing a distributed beamforming gain.

In some embodiments, the four-stage process described above can be adapted to simultaneously distribute the common message to multiple destinations.

FIGS. 2A-2D shows the four stages of an exemplary embodiment for distributed collaborative beamforming, in accordance with the disclosed technology.

Figure 2B:
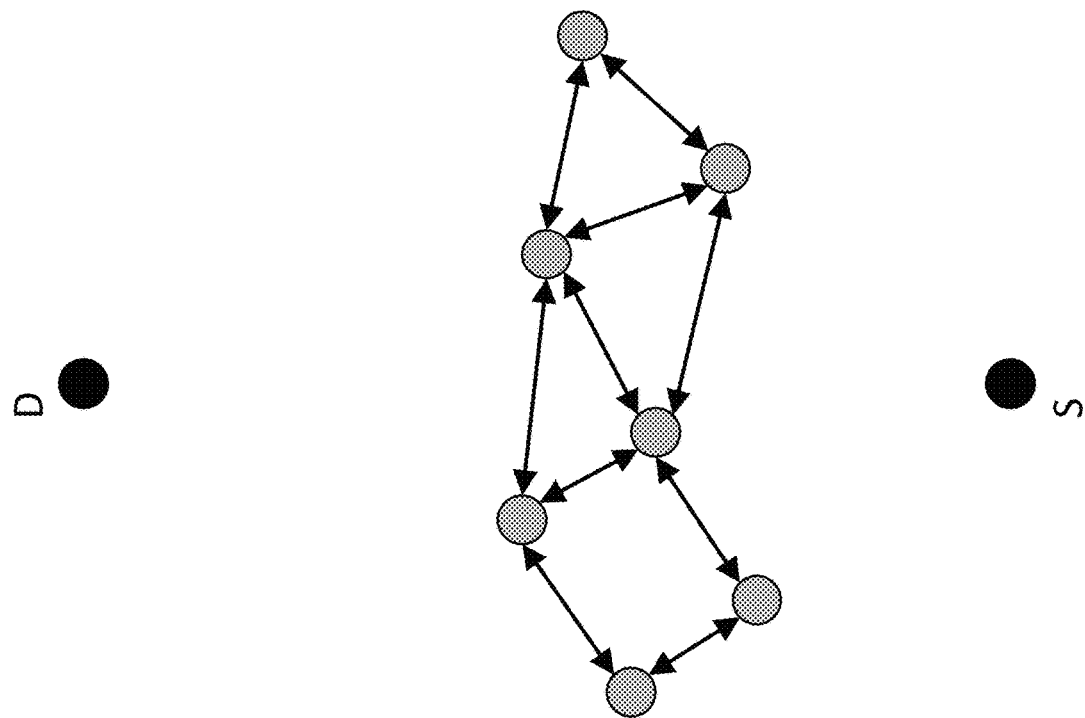
FIGS. 2A-2D shows the stages of an exemplary embodiment for distributed collaborative beamforming, in accordance with the disclosed technology.
Figure 2A:
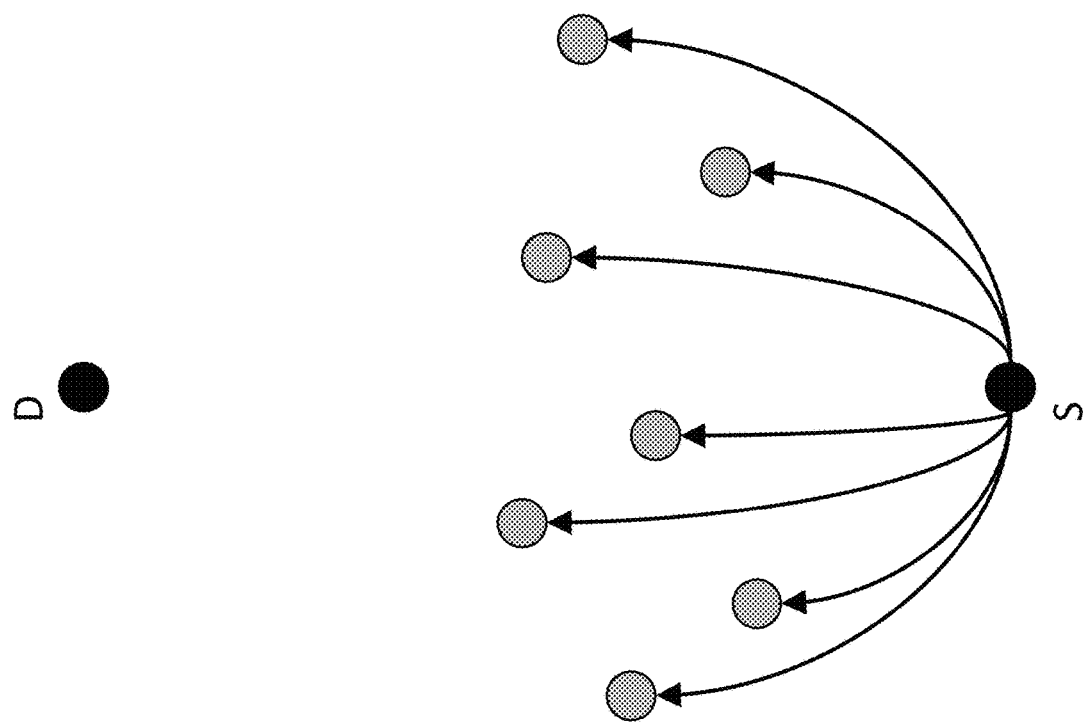

FIG. 2A shows an example of the first message-sharing stage, wherein the K network nodes (shaded grey) get possession of a common message from a source (S). In some embodiments, the message can be distributed via broadcast transmission by one of the network nodes (which also acts as the source in this first stage). In other embodiments, it may be broadcast by a source outside the network of K nodes (e.g., a drone or a satellite broadcasting this common message to a terrestrial network so that this network may further relay the message to D, otherwise unreachable by the source). In yet other embodiments, it may be shared via a backbone-type network (e.g., a high-speed optical network) distinct from the radio network.

FIG. 2B shows an example of the second self-coherence stage. In some embodiments, the purpose of the self-coherence process is to produce the matrix $\Delta\emptyset=\{\delta\emptyset_{ij}\}$; $i\neq j$; $i,j=1, 2, \ldots, K$, where $(\delta\emptyset_{ij}=2(\partial_i-\partial_j)$, where $\partial_i$ is the phase of the free-running, carrier-producing oscillator of radio node $N_i$. By definition, $\delta\emptyset_{ij}=0$ for any i. In an example, and as shown in FIG. 2B, this is achieved through a sequence of bi-directional probe-signal exchanges (or signal and message exchanges) between pairs of nodes (i,j).

Once the matrix $\delta\emptyset$ has been computed fully, a selection process identifies a proper column with desirable characteristics. The column is indexed by the so-called reference node $N_r$, e.g., the column $[\delta\emptyset_{1r}, \delta\emptyset_{2r}, \ldots, \delta\emptyset_{Kr}]$ is computed and stored at each node. The values coir, i=1, 2, ..., K, comprise the set of required correction phases that are used in the beamforming stage (Stage 4).

In some embodiments, the matrix $\delta\emptyset$ is computed by electing a priori a reference node, and computing only the reference column $[\delta\emptyset_{1r}, \delta\emptyset_{2r}, \ldots, \delta\emptyset_{Kr}]$.

In other embodiments, the matrix $\delta\emptyset$ is computed by performing a round-robin computation, starting from a chosen start node and proceeding sequentially, whereby each node i in the sequence selects its paired node j on the basis of the highest SNR from all links connected to it, the same is repeated by j, provided that the next selected pair node has not already been already covered before, and so on, until all nodes are exhausted. In another example, other link metrics (e.g., the highest signal-to-interference-plus-noise ratio (SINR)) may be used to select the next paired node.

In yet other embodiments, some entries of the matrix $\delta\emptyset$ may be determined via the use of the identities $2\delta\emptyset_{ji}=-2\delta\emptyset_{ij}$ and $2\delta\emptyset_{ij}=2\delta\emptyset_{ik}+2\delta\emptyset_{kj}$ (the latter named the "triangle identity"). Alternatively, all entries in AO are computed using the said identities plus an estimate of the quality (error variance) of the estimated value $\delta\emptyset_{ij}$.

For the computation of the matrix $\delta\emptyset$ in the embodiments described above, neither a fully-connected network (e.g., radio nodes in multiple hops may participate) nor a static network (e.g., dynamic phase tracking may be included in the computation) is required. In some embodiments, the value $\delta\emptyset_{ij}$ can be computed in one of two ways: either via pure bidirectional exchanges of signals or via a mixture of signal exchanges and message exchanges.

Bidirectional Signal Exchanges.

In some embodiments, a pure bidirectional exchange between nodes $N_i$ and $N_j$ includes the node $N_i$ first emitting a signal, e.g., a probe akin to a tone, i.e. $s_i^{pb}(t)=\cos(2\pi f_c t+\partial_i)$.

In complex-envelope notation, the tone $s_i^{pb}(t)=Re\{e^{j\partial_i}e^{i2\pi f_c t}\}$ and the complex envelope is $\tilde{s}_i^{pb}(t)=e^{j\theta_i}$. A transmission induces a positive phase shift of $\partial_i$ to the transmitted carrier $\cos(2\pi f_c t)$. Correspondingly, the receiver of node $N_j$ mixes the incoming signal with $\cos(2\pi f_c t+\partial_j)$, and thus any reception equivalently subtracts the local phase $\theta_1$. Neglecting the channel gain scaling, the intervening narrowband channel multiplies with the phasor $$e^{j\theta_{i\to j}^{ch}},$$

therein adding the random-variable phase of $\partial_{i\to j}^{ch}$, and the total phase at the receiver node $N_j$ is $\theta_{i\to j}^{total}=\partial_i+\partial_{i\to j}^{ch}-\partial_j$.

In this exemplary pure bi-directional exchange, node $N_j$ produces, at baseband, the negative of the total phase $-\theta_{i\to j}^{total}=-\partial_i-\partial_{i\to j}^{ch}+\partial_j$ (referred to as "conjugation" or "phase reversal"). Upon up-conversion (which adds the phase $\partial_j$), propagation through the reciprocal channel (which adds the phase $\partial_{i\to j}^{ch}$ and thus cancels the term $-\partial_{i\to j}^{ch}$) and down-conversion at node $N_i$ (which subtracts the phase $\partial_i$), the total phase at the radio baseband of node $N_i$ is $\theta_{i\leftrightarrow j}^{total}(-\partial_i-\partial_{i\to j}^{ch}+\partial_j)+\partial_j+\partial_{i\to j}^{ch}-\partial^i=2(\partial_j-\partial_i)=-\delta\emptyset_{ij}$.

In some embodiments, node $N_j$ can be informed of this value through the messaging protocol. In other embodiments, node $N_j$ can initiate its own bidirectional exchange with node $N_j$ in order to compute $\delta\emptyset_{ji}$.

Although, in principle, $\delta\emptyset_{ji}=-\delta\emptyset_{ij}$ in practice, such estimates may be noisy. In some embodiments, the network protocol may allow for message exchanges between nodes, and a better estimate of $\delta\emptyset_{ij}$ can be made by both nodes by averaging the individual estimates.

Message and Signal Exchanges.

In some embodiments, a mixture of signal and message exchanges includes the node $N_i$ initiates the emission of a probe, as before, and node $N_j$ computes $\theta_{i\to j}^{total}=\partial_i+\partial_{i\to j}^{ch}-\partial_j$, as described above. In this embodiment, Node $N_j$ sends, to node $N_i$, an information-carrying message containing this computed value of $\theta_{i\to j}^{total}$. Contemporaneously with this message, node $N_j$ emits a probe signal, so that node $N_i$ can in turn compute the phase $\theta_{j\to i}^{total}=\partial_j+\partial_{j\to i}^{ch}-\partial_i$. Under the assumption of channel reciprocity, $\partial_{i\to j}^{ch}=\partial_{j\to i}^{ch}$. Thus, node $N_i$ possesses knowledge of $\theta_{i\to j}^{total}$ as well as $\theta_{j\to i}^{total}$ and can easily infer that $\theta_{i\leftrightarrow j}^{total}=\theta_{j\to i}^{total}-\theta_{i\to j}^{total}=-\delta\emptyset_{ij}$.

In some embodiments, and as described in the context of bidirectional signal exchanges, the nodes can repeat that process by now starting from $N_j$, or can share the estimated value of $\delta\emptyset_{ij}$ via messaging.

Figure 2D:
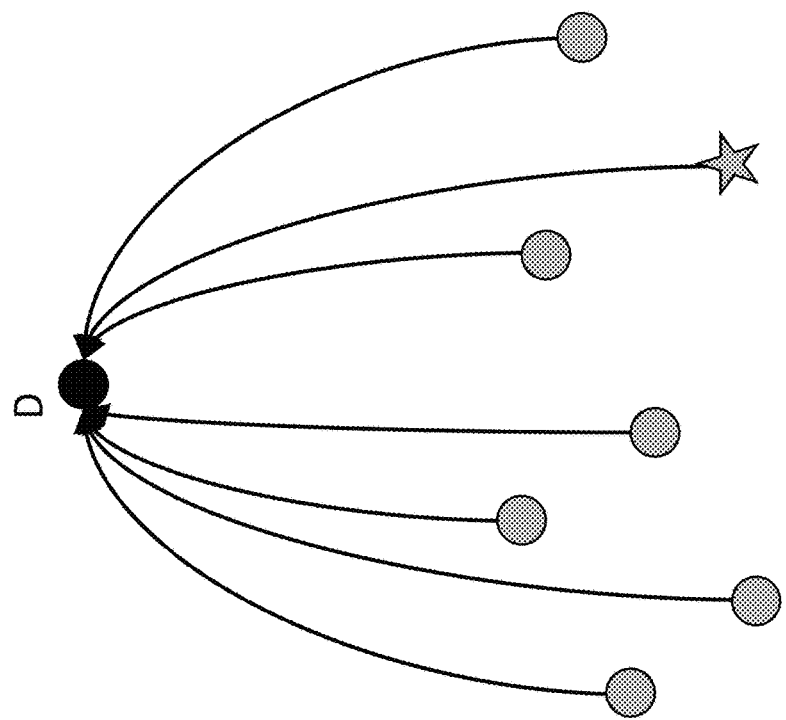
Figure 2D:
Figure 2C:
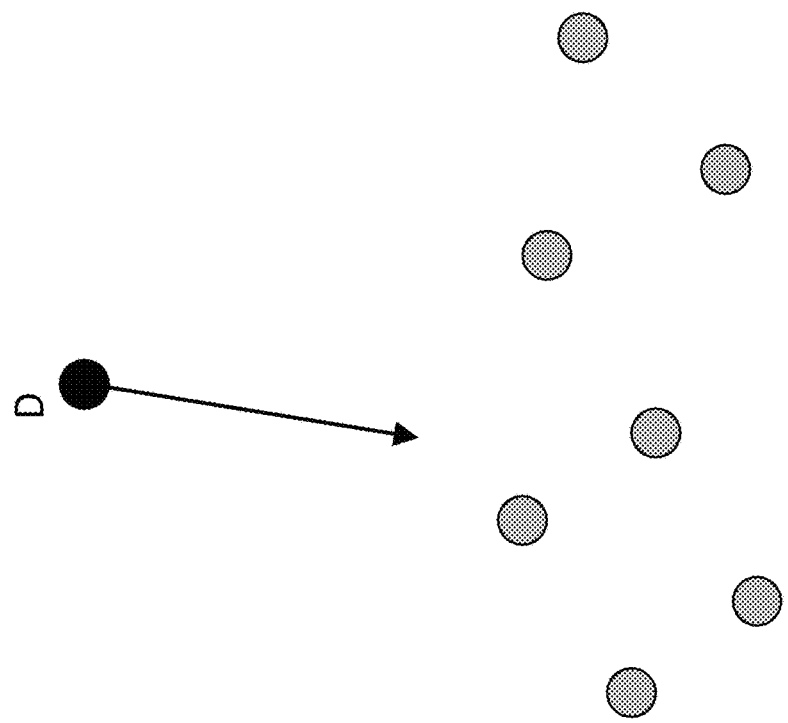
Figure 2C:

FIG. 2C shows an example of the third per-node phase estimation stage. In some embodiments, the destination node (D) broadcasts a probe, and each of the network nodes computes a tap-spaced, complex-valued baseband channel model in response to receiving the probe from the destination node. At each node, the magnitudes of the estimated taps are compared and the largest is selected, and then used to compute an argument (phase) estimate $\partial_i^{str\_tap}$ for each node i=1, 2, ..., K.

FIG. 2D shows an example of the fourth destination beamforming stage. In some embodiments, the transmission from node $N_i$ is performed with a total correction phase given by $\partial_i^{total\_corr} = -\partial_i^{str\_tap} - \delta\emptyset_{ir}$.

In some embodiments, the distributed collaborative beamforming process described in the context of FIGS. 2A-2D results in the destination node D receiving a multitude of taps. The taps arriving at D include (i) those that have been subjected to the processing of Stage 3 and have been subsequently transmitted with the proper phase $\partial_i^{total\_corr}$ from each node $N_i$, and (ii) all the remaining taps which have not been processed as per Stage 3 (namely, all taps except the selected strongest). All selected and processed taps contributing to the superimposed (co-transmitted) baseband channel model at the destination node D are in principle phase-aligned, with a common complex-baseband argument (phase) equal to $\delta\emptyset_{rD}$, thus producing a coherent beamforming gain modulo $\delta\emptyset_{rD}$. The remaining non-selected and non-processed channel taps coming from all nodes and contributing to the superimposed channel at D act as non-coherent taps and do not provide beamforming gain, although they provide noncoherent power gains.

An Exemplary Embodiment with Multiple Destinations

Embodiments of the disclosed technology may be used to simultaneously transmit the same common message to multiple destinations (denoted $D_1, D_2, \ldots, D_L$). In this embodiment, it is assumed that:

the self-coherence stage of stage 2 has been performed, the reference node $N_r$ selected and the column $[\delta\emptyset_{1r}, \delta\emptyset_{2r}, \ldots, \delta\emptyset_{Kr}]$ has been computed and stored, and the beacons from $D_1, D_2, \ldots, D_L$ have been received and processed by each node as per Stage 3. In some embodiments, the order by which the beacons are received by the network nodes without mutual interference may vary. In an example, they may arrive as a sequence in time (e.g., a random-access scheme with destination identification included). In another example, they may involve multiple mutually-orthogonal beacons (e.g., modulated by orthogonal spreading codes as in CDMA).

Each node $N_i$ then computes the transmitted total correction phase $\partial_{i \to D_l}^{total\_corr}$ corresponding to each destination $D_l$; $l=1, 2, \ldots, L$ as per Stage 4 above.

For multi-destination beamforming, each node $N_i$ transmits the complex phasor $$e^{j\partial_{i \to all\,D}^{total\_corr}} = C_i \sum_{l=1,\ldots,L} e^{j\partial_{i \to D_l}^{total\_corr}}.$$

Herein, the constant $$C_i = 1 \bigg/ \left| \sum_{l=1,\ldots,L} e^{j\partial_{i \to D_l}^{total\_corr}} \right|$$

is the normalization factor ensuring constant-envelope transmission. This ensures that the selected and processed taps contributing to the superimposed (co-transmitted) baseband channel model at the destination node $D_l$ will in principle be phase-aligned with phase $\delta\emptyset_{rD_l}$, thus contributing to a coherent gain, whereas all other terms will add noncoherently, contributing to a noncoherent gain.

Additional Exemplary Embodiments of the Presently Disclosed Technology

In some embodiments, all the network nodes are fully connected. The selection of a reference node, which completes Stage 2 with all nodes individually, may be performed in a sequence of its choice, since all nodes are within hearing range of the reference node. The choice of the reference node may pertain to the best average link SNR (averaged over all other nodes). More generally, any function (e.g., average, median, maximum, etc.) of a link-quality metric (e.g., SNR, SINR, etc.) may be used in the determination of the choice of the network node. It is further assumed, in this embodiment, that link-quality information is available to all nodes which share it and update it regularly.

In some embodiments, the reference node may have good access to some but not all the nodes of the network due to some low-quality links. The reference node may identify such impaired-link nodes and request, via proper messages, the help of neighboring nodes (e.g., send a request that they perform bidirectional exchanges with the impaired-link nodes in more favorable link conditions and thus assist in completing the full reference column via the said identities).

In some embodiments, there may be information on the nature of links (e.g., line-of-sight (LoS) or non-LoS (NLoS)), which may be used to determine which links are to be used by each node in its own bidirectional exchanges (e.g., only the LoS links may be used), in the process of filling out the phase matrix.

In some embodiments, an initial node may be chosen either at random, or via a quality metric (e.g., best link SNR among nodes), and is referred to as "node 1". Node 1 completes $\delta\emptyset_{12}$ with a second node ("node 2"), which may be the node within hearing range of node 1 with the highest link SNR of all links out of node 1. The pair (1,2) is announced via a short message, so that all nodes in the network know which pairs have been covered. Then node 2 completes $\delta\emptyset_{23}$ with a subsequent node ("node 3"), chosen in a similar manner as before, and the pair is announced, and so on. The process ends when all nodes within hearing range (e.g., one-hop nodes) have been completed. If there are nodes within hearing range in some portion of the network (e.g., in a network of at least 2 hops), then a node from the second hop requests participation to the self-coherence process. The node(s) which hear it extend the process to that node, which then completes the process for those in the second-hop hearing range, and the process repeats until all hops have been covered. Thus, distributed collaborative beamforming can be applied to multi-hop (and not fully connected) networks, provided that the whole multi-hop network is within range of the probe of destination D for the subsequent stages.

In some embodiments, the estimate of the individual terms $\delta\emptyset_{ij}$ may be accompanied by a quality metric, signifying the confidence of the estimating node on the quality of the said term (e.g., an estimated error variance). The various quality metrics may be distributed in message exchanges and used subsequently to refine estimates either via the use of identities (such as the triangle identity) when completing the matrix $\Delta\emptyset$, namely by incorporating weighting terms in the computation, or in refining final estimates of reciprocal links ((i→j) and (j→i)), assuming that the protocol allows computation of both. The final quality metrics for all relevant phase-difference qualities may be used for selecting the reference node, e.g., as the one whose column possesses the highest average quality metric. Links for which the quality of the estimate $\delta\emptyset_{ij}$ is deemed unacceptable (too noisy) may discard the estimate and another sequence of nodes in the computation process may be selected.

In some embodiments, individual links may be subjected to significant interference (e.g., due to jamming). The elements of the matrix corresponding to such corrupted links may be eliminated from the bidirectional signal exchange (phase measurement) process. Instead, the said elements may be filled in via other measurements in related uncorrupted links and the use of the aforementioned identities (e.g., the triangle identity).

In some embodiments, the network nodes may use separate oscillator phases for the transmit and receive modes.

In some embodiments, the terms $\delta\emptyset_{ij}$ are computed not just by bidirectional signal exchanges between nodes but by a mixture of signal exchanges as well as message exchanges, whereby the messages convey the (quantized) value of the estimated baseband phase of the radio that has received a signal and has computed such a phase. The final estimate of $\delta\emptyset_{ij}$ is computed by proper combination of the signal phases as well as the massage-conveyed phase values.

In some embodiments, the terms $\delta\emptyset_{ij}$ are estimated via parameter-tracking methods which account for mobility and phase-noise impairments. Such phase-tracking methods can also be used to fill in (e.g. by prediction) estimated values in case the process is interrupted for a short period of time. In an example, these tracking methods can also be used to reduce the frequency for bidirectional exchanges, thus lowering the network overhead traffic necessary to support the embodiments described in the present document.

In some embodiments, a variety of methods in may be employed in choosing the strongest channel tap for computing the respective phase. In an example, the strongest channel tap is the direct largest gain value among taps. In another example, a complex channel tap is computed via interpolation methods between taps estimated using the observation samples (measurements) of the channel-estimation process.

Methods for Distributed Collaborative Beamforming

Figure 3:
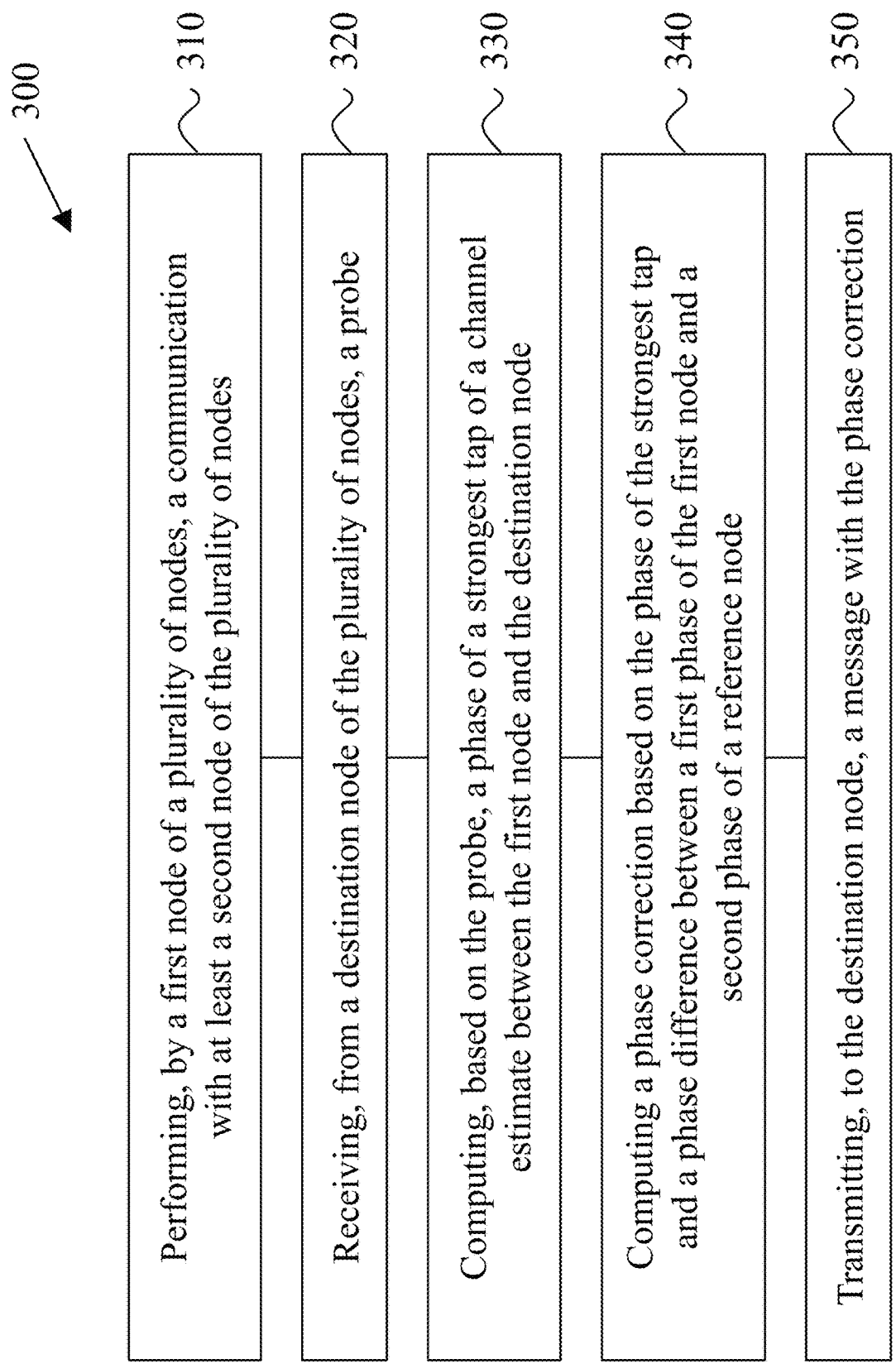
FIG. 3 shows a flowchart of an exemplary method for collaborative wireless communication, in accordance with embodiments of the disclosed technology.

FIG. 3 shows a flowchart of an example of a method 300 for collaborative wireless communication. The method 300 includes, at step 310, performing, by a first node of a plurality of nodes, a communication with at least a second node of the plurality of nodes.

The method 300 includes, at step 320, receiving, by the first node from a destination node of the plurality of nodes, a probe.

The method 300 includes, at step 330, computing, based on the probe, a phase of a strongest tap of a channel estimate between the first node and the destination node.

The method 300 includes, at step 340, computing a phase correction based on the phase of the strongest tap and a phase difference between a first phase of the first node and a second phase of a reference node, wherein the phase difference is based on the communication.

The method 300 includes, at step 350, transmitting, to the destination node, a message with the phase correction.

In some embodiments, an i-th node of the plurality of nodes is configured to compute an i-th phase correction, and the plurality of nodes is configured to transmit the message with the corresponding phase correction concurrently. In an example, the concurrent transmission from each of the nodes is substantially at the same time (e.g., accounting for timing errors due to hardware mismatches, processing delays, and the like).

In some embodiments, the phase difference is an entry of a phase matrix, an (ij)-th entry of the phase matrix comprises twice a phase difference between a phase of an i-th node and a phase of a j-th node, and the i-th node and the j-th node are different from the destination node. In an example, the reference node is selected from the plurality of nodes after at least one row or at least one column of the phase matrix has been determined. In an example, the at least one row or at least one column of the phase matrix that is determined is the same row or column at each of the plurality of nodes, thereby enabling each of the plurality of nodes to select the same reference node.

In another example, an entry of the phase matrix corresponding to the first node and a third node is determined based on entries of the phase matrix corresponding to (i) the first node and a fourth node and (ii) the third node and the fourth node.

In some embodiments, the method 300 further includes the steps of determining at least one link quality metric between one or more pairs of nodes from the plurality of nodes, and selecting the reference node based on a function of the at least one link quality metric. In an example, the determining is based on a pilot signal or a tone. In another example, the at least one link quality metric is a signal-to-noise ratio (SNR) or a signal-to-interference-plus-noise ratio (SINR) of a channel between the reference node and the corresponding node of the plurality of nodes. In yet another example, the function is an average, a median or a maximum of the at least one link quality metric.

In some embodiments, the method 300 further includes the step of receiving information corresponding to the message from (a) a third node of the plurality of nodes, (b) a backbone-type network or (c) a source node that is different from each of the plurality of nodes.

In some embodiments, the communication comprises a bi-directional communication that is performed with each of the plurality of nodes.

In some embodiments, the communication or the probe comprises a constant envelope signal.

Figure 4A:
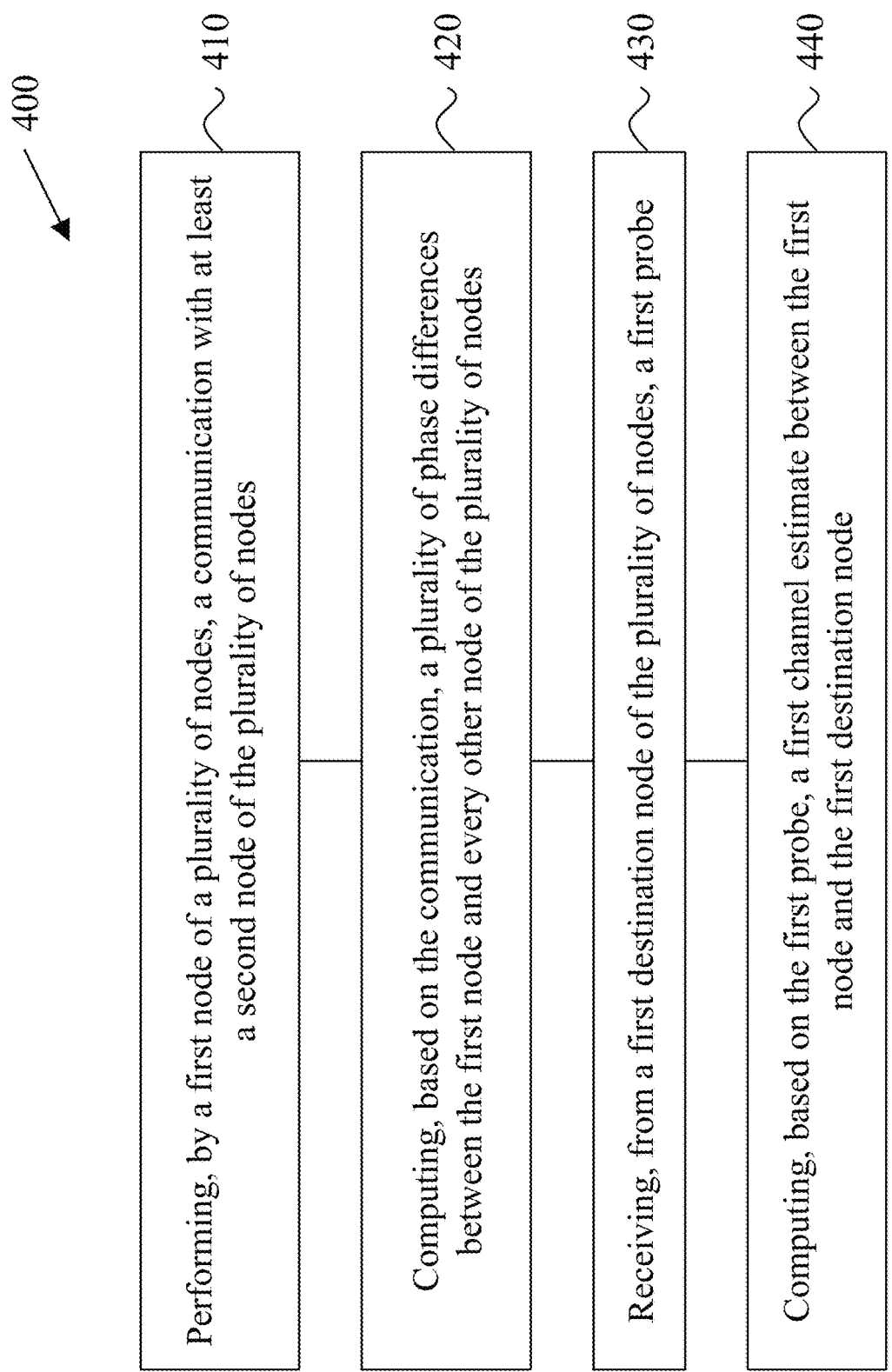
FIGS. 4A and 4B show a flowchart of another exemplary method for collaborative wireless communication, in accordance with embodiments of the disclosed technology.
Figure 4B:
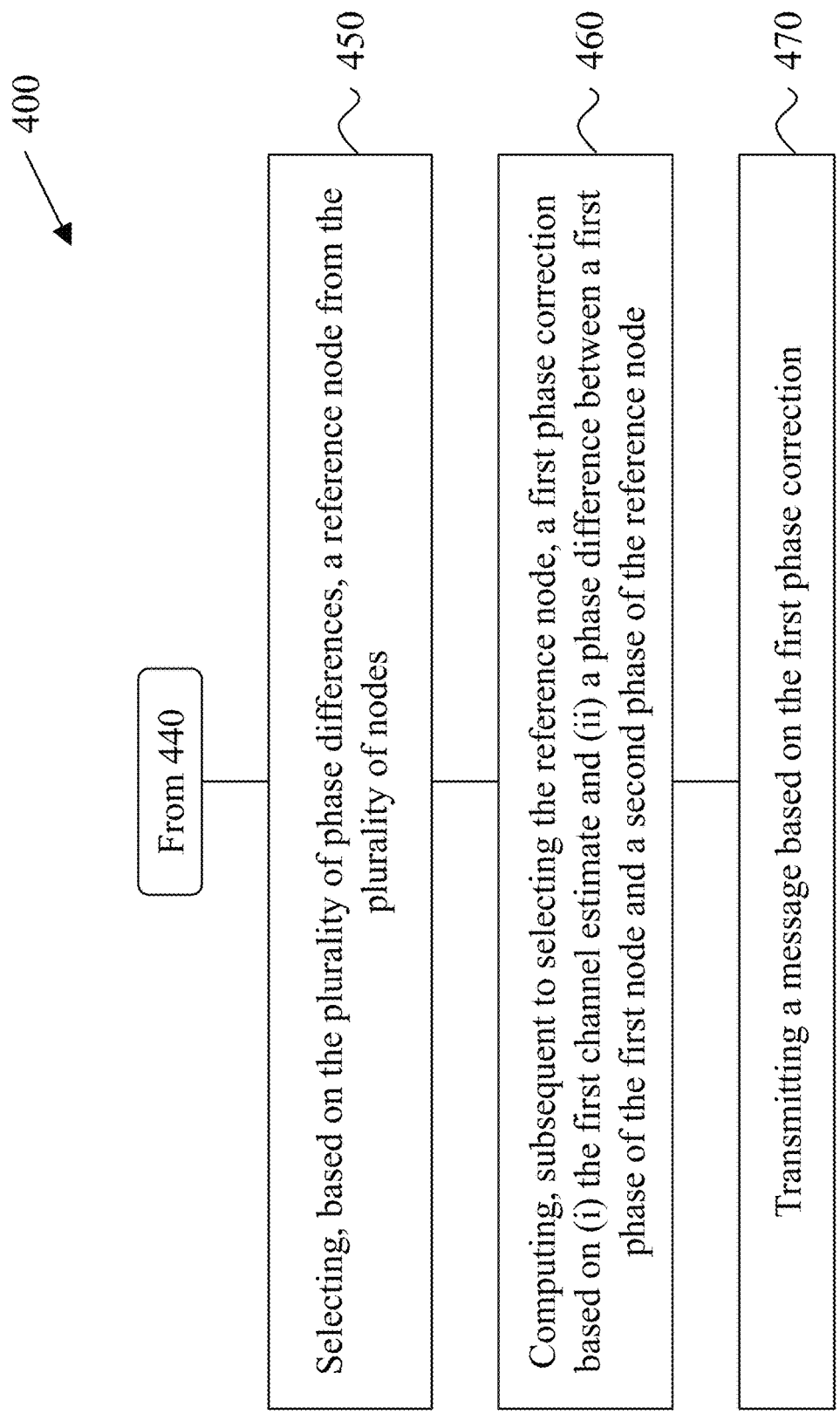

FIGS. 4A and 4B show a flowchart of another example of a method 400 for collaborative wireless communication. The method 400 includes, at step 410, performing, by a first node of a plurality of nodes, a communication with at least a second node of the plurality of nodes.

The method 400 includes, at step 420, computing, based on the communication, a plurality of phase differences between the first node and every node of the plurality of nodes.

The method 400 includes, at step 430, receiving, from a first destination node of the plurality of nodes, a first probe.

The method 400 includes, at step 440, computing, based on the first probe, a first channel estimate between the first node and the first destination node.

The method 400 includes, at step 450, selecting, based on the plurality of phase differences, a reference node from the plurality of nodes.

The method 400 includes, at step 460, computing, subsequent to selecting the reference node, a first phase correction based on (i) the first channel estimate and (ii) a phase difference between a first phase of the first node and a second phase of the reference node.

The method 400 includes, at step 470, transmitting a message based on the first phase correction.

In some embodiments, the plurality of phase differences correspond to a row or a column of a phase matrix, and an (i,j)-th entry of the phase matrix comprises twice a phase difference between a phase of an i-th node and a phase of a j-th node.

In some embodiments, the method 400 further includes the steps of receiving, from a second destination node, a second probe, computing, based on the second probe, a second channel estimate between the first node and the second destination node, and computing, subsequent to selecting the reference node, a second phase correction based on the second channel estimate and the phase difference, wherein transmitting the message is further based on the second phase correction. In an example, computing the first and second channel estimate comprises computing a phase of a strongest tap of the first and second channel estimate, respectively.

In some embodiments, the computing the plurality of phase differences is further based on tracking a phase of at least one of the plurality of nodes.

In some embodiments, the method 400 further includes the step of updating at least one of the plurality of phase differences based on one or more of oscillator frequency offsets, oscillator frequency drifts and phase noise.

In some embodiments, and in the context of methods 300 and 400, each node of the plurality of nodes is operable as a source node, a relay node or a destination node. For example, each node may be a handheld radio in an ad-hoc network that is capable of sourcing a first transmission, relaying a received second transmission and receiving a third transmission without relaying it onwards since it is the destination for that third transmission.

FIG. 5 is a block diagram representation of a portion of a radio, in accordance with some embodiments of the presently disclosed technology. A radio 511 can include processor electronics 501 such as a microprocessor that implements one or more of the techniques presented in this document. The radio 511 can include transceiver electronics 503 to send and/or receive wireless signals over one or more communication interfaces such as antenna(s) 509. The radio 511 can include other communication interfaces for transmitting and receiving data. Radio 511 can include one or more memories 507 configured to store information such as data and/or instructions. In some implementations, the processor electronics 501 can include at least a portion of the transceiver electronics 503. In some embodiments, at least some of the disclosed techniques, modules or functions (including, but not limited to, methods 300 and 400) are implemented using the radio 511.

It is intended that the specification, together with the drawings, be considered exemplary only, where exemplary means an example and, unless otherwise stated, does not imply an ideal or a preferred embodiment. As used herein, "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for collaborative wireless communication, comprising:
    performing, by a first node of a plurality of nodes, a communication with at least a second node of the plurality of nodes;
    receiving, by the first node from a destination node of the plurality of nodes, a probe;
    computing, based on the probe, a phase of a strongest tap of a channel estimate between the first node and the destination node;
    computing a phase correction based on the phase of the strongest tap and a phase difference between a first phase of the first node and a second phase of a reference node, wherein the phase difference is based on the communication; and transmitting, to the destination node, a message with the phase correction.

2. The method of claim 1, wherein an i-th node of the plurality of nodes is configured to compute an i-th phase correction, and wherein the plurality of nodes is configured to transmit the message with the corresponding phase correction concurrently.

3. The method of claim 1, wherein the phase difference is an entry of a phase matrix, wherein an (i,j)-th entry of the phase matrix comprises twice a phase difference between a phase of an i-th node and a phase of a j-th node, and wherein the i-th node and the j-th node are different from the destination node.

4. The method of claim 3, wherein the reference node is selected from the plurality of nodes after at least one row or at least one column of the phase matrix has been determined.

5. The method of claim 4, further comprising:
determining at least one link quality metric between one or more pairs of nodes from the plurality of nodes; and
selecting the reference node based on a function of the at least one link quality metric.

6. The method of claim 5, wherein the determining is based on a pilot signal or a tone.

7. The method of claim 5, wherein the at least one link quality metric is a signal-to-noise ratio (SNR) or a signal-to-interference-plus-noise ratio (SINR) of a channel between the reference node and the corresponding node of the plurality of nodes.

8. The method of claim 5, wherein the function is an average, a median or a maximum of the at least one link quality metric.

9. The method of claim 3, wherein an entry of the phase matrix corresponding to the first node and a third node is determined based on entries of the phase matrix corresponding to (i) the first node and a fourth node and (ii) the third node and the fourth node.

10. The method of claim 1, further comprising:
receiving information corresponding to the message from (a) a third node of the plurality of nodes, (b) a backbone-type network or (c) a source node that is different from each of the plurality of nodes.

11. The method of claim 1, wherein the communication comprises a bi-directional communication that is performed with each of the plurality of nodes.

12. The method of claim 1, wherein the communication or the probe comprises a constant envelope signal.

13. A method for collaborative wireless communication in a network comprising a plurality of nodes, the method comprising:
performing, by a first node of a plurality of nodes, a communication with at least a second node of the plurality of nodes;
computing, based on the communication, a plurality of phase differences between the first node and every node of the plurality of nodes;
receiving, from a first destination node of the plurality of nodes, a first probe;
computing, based on the first probe, a first channel estimate between the first node and the first destination node;
selecting, based on the plurality of phase differences, a reference node from the plurality of nodes;
computing, subsequent to selecting the reference node, a first phase correction based on (i) the first channel estimate and (ii) a phase difference between a first phase of the first node and a second phase of the reference node; and
transmitting a message based on the first phase correction.

14. The method of claim 13, wherein the plurality of phase differences correspond to a row or a column of a phase matrix, and wherein an (i,j)-th entry of the phase matrix comprises twice a phase difference between a phase of an i-th node and a phase of a j-th node.

15. The method of claim 13, further comprising:
receiving, from a second destination node, a second probe;
computing, based on the second probe, a second channel estimate between the first node and the second destination node; and
computing, subsequent to selecting the reference node, a second phase correction based on the second channel estimate and the phase difference,
wherein transmitting the message is further based on the second phase correction.

16. The method of claim 15, wherein computing the first and second channel estimate comprises computing a phase of a strongest tap of the first and second channel estimate, respectively.

17. The method of claim 13, wherein the computing the plurality of phase differences is further based on tracking a phase of at least one of the plurality of nodes.

18. The method of claim 13, further comprising:
updating at least one of the plurality of phase differences based on one or more of oscillator frequency offsets, oscillator frequency drifts and phase noise.

19. A system for collaborative wireless communication, comprising:
a plurality of nodes,
wherein each of the plurality of nodes is configured to:
receive a message from a source node;
perform a bi-directional communication with at least one other node of the plurality of nodes;
compute, based on the bi-directional communication, a plurality of phase differences between the each of the plurality of nodes and every other node of the plurality of nodes;
receive a probe from a destination node that is different from the source node and each of the plurality of nodes;
compute, based on the probe, a phase of a strongest tap of a channel estimate between the each of the plurality of nodes and the destination node;
select, based on the plurality of phase differences, a reference node from the plurality of nodes;
compute, subsequent to selecting the reference node, a phase correction based on the phase of the strongest tap and a phase difference between a first phase of the each of the plurality of nodes and a second phase of the reference node; and
transmit, to the destination node and concurrently with every other node of the plurality of nodes, the message with the phase correction.

20. The system of claim 19, wherein the source node is (a) one of the plurality of nodes, (b) a backbone-type network node or (c) a node different from the plurality of nodes.

21. The system of claim 19, wherein the bi-directional communication or the probe comprises a constant envelope signal.

* * * * *